United States Patent [19]
Shimizu et al.

[11] Patent Number: 5,801,718
[45] Date of Patent: Sep. 1, 1998

[54] VIDEO SIGNAL PROCESSING CIRCUIT FOR MONITORING ADDRESS PASSING BETWEEN WRITE ADDRESSES AND READ ADDRESSES IN A BUFFER MEMORY

[75] Inventors: Yutaka Shimizu, Ota; Seiya Ota, Ama-gun, both of Japan

[73] Assignee: Sanyo Electric Co., Ltd., Osaka, Japan

[21] Appl. No.: 732,844

[22] Filed: Oct. 15, 1996

[30] Foreign Application Priority Data

Oct. 16, 1995 [JP] Japan ................. 7-267105

[51] Int. Cl.⁶ .................................. G06F 13/00
[52] U.S. Cl. .................. 345/508; 345/213; 345/515; 395/821
[58] Field of Search .......................... 345/508, 515, 345/516, 213; 395/821, 853, 855, 872, 873

[56] References Cited

U.S. PATENT DOCUMENTS

4,945,548  7/1990  Iannarone et al. ............... 375/372
5,543,824  8/1996  Priem et al. ..................... 345/508

Primary Examiner—Kee M. Tung
Attorney, Agent, or Firm—Loeb & Loeb LLP

[57] ABSTRACT

A write clock signal and a write select signal are outputted from an input video clock generator, a read clock signal and a read select signal are outputted from a display video clock generator, either of first and second field memories is selected as the write memory or the read memory in compliance with the signal level of the respective select signal and writing is carried out in the selected write memory once a predetermined time has elapsed following inversion of the write select signal. When reading has commenced from the first and second buffer memory, a match is detected between the signal levels of the write select signal and the read select signal at each field or at each frame and writing and thus reading address passing is predicted.

10 Claims, 8 Drawing Sheets

VIDEO SIGNAL PROCESSING CIRCUIT FOR MONITORING ADDRESS PASSING BETWEEN WRITE ADDRESSES AND READ ADDRESSES IN A BUFFER MEMORY

BACKGROUND OF THE INVENTION

Field of the Invention

The present invention relates to a video signal processing circuit using a buffer memory such as a field memory or a frame memory for time-axis converting an inputted video signal and creating a display video signal with a different synchronizing signal and in particular to a circuit for monitoring address passing of a write address and a read address in a buffer memory.

Description of the Prior Art

When a video signal from a personal computer and such like is displayed on a normal television receiver, or when a normal television signal is displayed on a television receiver not operating in synchrony with the normal television signal, it is necessary to change the time-axis of the video signal. Therefore, a process has been generally carried out wherein an inputted video signal is temporarily written into a buffer memory such as a field memory or frame memory in compliance with a write clock corresponding to a synchronizing signal of the inputted video signal. In compliance with a read clock corresponding to a synchronizing signal of the video signal to be displayed, the video signal which has been written is read out and displayed as a display video signal.

When a buffer memory as described above is used, since the synchronizing signal frequencies of the input video signal and the display video signal are different, either one of the write address and the read address inevitably passes the other. (The term "address passing" used hereinafter means that either the write address or the read address becomes larger than the other during the reading or writing operation.) As a result, two fields or frames of an input image within a single screen of the display image are switched causing considerable loss in picture quality.

Therefore, the present applicant proposed a method described in Japanese Patent Application No. Hei 7-252115. According to this method, switching of display contents within a single screen is prevented by monitoring a write address and a read address corresponding to a buffer memory, predicting whether one will pass the other and controlling writing or reading in accordance with this prediction result.

A buffer memory such as a field memory or a frame memory normally contains an address counter and write and read addresses are determined based on inputted clocks. An address consisting of the output of the address counter is therefore monitored in order to predict address passing. This configuration has the problem that a large-scale circuit is required since the bit number of the addresses themselves is high.

SUMMARY OF THE INVENTION

It is therefore the object of the present invention to provide a video signal processing circuit with a simple circuit capable of predicting generation of address passing during reading and writing.

In the present invention an input video signal is written alternately in first and second buffer memories and a display signal is read out alternately from these first and second buffer memories. When reading commences from either one of the first and second buffer memories, a detecting circuit detects whether or not the buffer memory which is carrying out writing matches the buffer memory which is about to carry out reading. Generation of address passing in reading and writing is predicted in accordance with the detection result of this detecting circuit.

For instance, generation of address passing is predicted when the detection result has changed from non-matching to matching.

Furthermore, when address passing has been predicted, reading is again carried out from the buffer memory from which the reading has been completed and the reading is carried out from the buffer memory which is not carrying out writing. Consequently, the generation of address passing during reading out from one buffer memory can be prevented.

Furthermore, according to another aspect of the present invention, an input video signal is written in first and second buffer memories in compliance with a write clock synchronized to a first synchronizing clock and a display video signal is read out from first and second buffer memories in compliance with a read clock synchronized to a second synchronizing clock. An input video clock generator outputs the write clock and a write select signal with an alternately inverting signal level synchronized to the vertical synchronizing signal of the input video signal. A display video clock generator outputs the read clock and a read select signal with an alternately inverting signal level synchronized to the vertical synchronizing signal of the display video signal.

Furthermore, in accordance with the signal level of the write select signal, a video signal processing circuit of the present invention selects either one of first and second buffer memories and writes an input video signal into the selected buffer memory. In addition, in accordance with the signal level of the read select signal, a display video signal is read out from either one of first and second buffer memories starting at a predetermined time after inversion of the read select signal.

When reading from the first and second buffer memories commences, a detecting circuit detects whether or not the signal levels of the write select signal and the read select signal match. Address passing between read and write addresses of the first and second buffer memories is thus predicted according to a detection result of this detecting circuit.

It is particularly desirable that the detecting circuit has a register for storing detection results. By controlling whether or not to invert the read select signal in compliance with the content of this register, the generation of address passing is predicted when the detection result of the detecting circuit changes and reading is then carried out continuously from a single buffer memory. Consequently, the generation of address passing during reading out from one buffer memory can be prevented.

Moreover, writing commences after a predetermined period of time has elapsed following inversion of a write select signal. If discrepancies between writing and reading occur within this predetermined time period for one read operation, address passing during reading can be reliably prevented.

In addition, generation of address passing may be predicted based on a detection result when it is detected whether or not a buffer memory presently carrying out reading and a buffer memory about to commence writing match. When address passing has been predicted, writing is again carried out in the buffer memory in which the writing has been completed.

Furthermore, reading out should preferably commence after a predetermined period of time has elapsed following inversion of a read select signal.

In addition, it can be detected whether or not a read memory and a write memory match by a simple logical calculation using a read select signal, a write select signal and the like.

DESCRIPTION OF THE PREFERRED EMBODIMENTS

Figure 2:
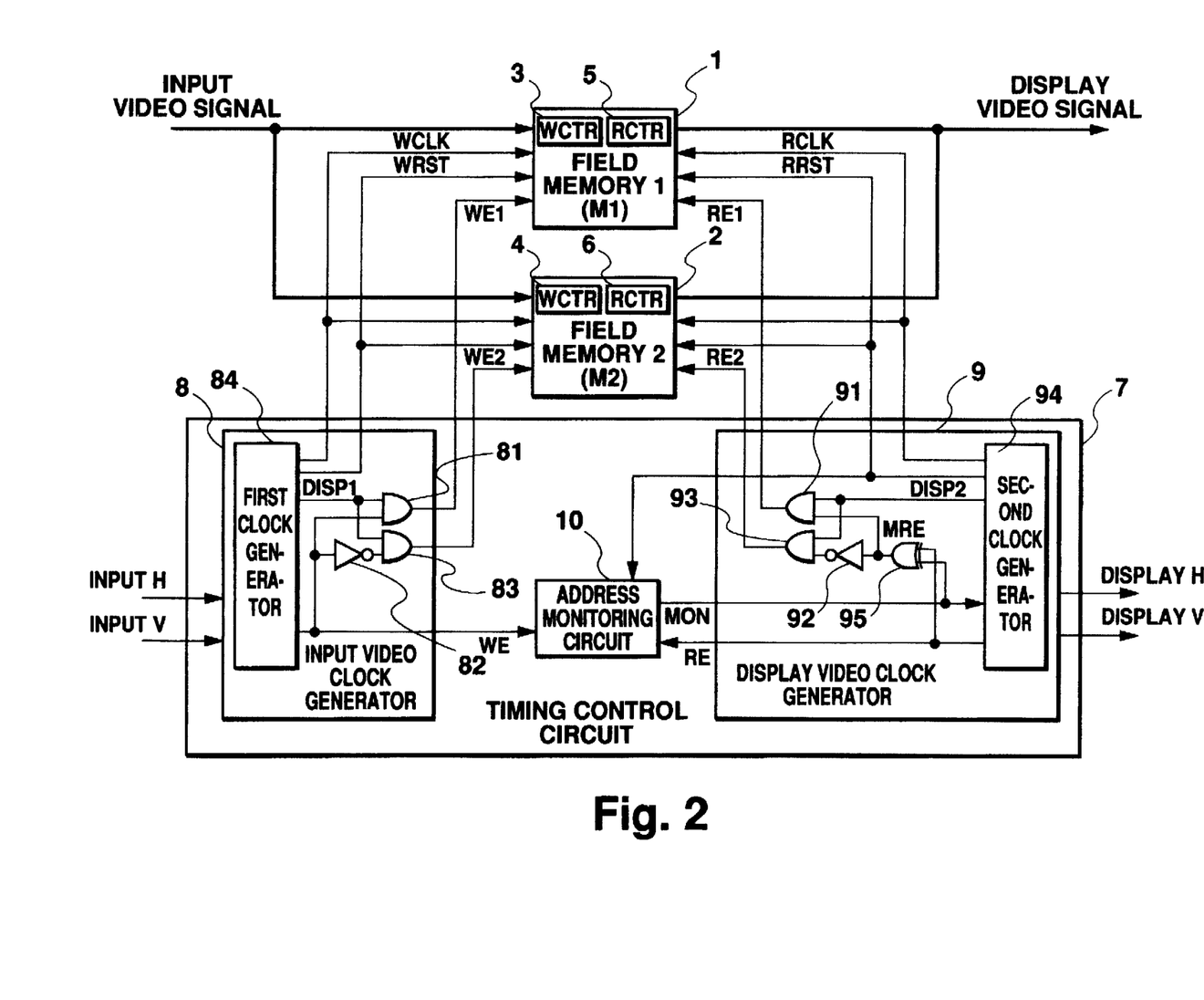
FIG. 2 is a block diagram depicting a video signal processing circuit.

FIG. 2 is a block diagram showing an embodiment of the present invention, in which 1 and 2 denote respectively first and second field memories (M1, M2) for storing an input video signal for 1 field. Write address counters WCTR3, WCTR4 are provided in order to specify write addresses for the first and second field memories 1, 2 and read address counters RCTR5, RCTR6 are provided in order to specify read addresses. Writing and reading are controlled by a variety of signals sent from a timing control circuit 7.

A timing control circuit 7 has an input video clock generator 8 for generating a clock in order to control writing, a display video clock generator 9 for generating a clock in order to control reading and an address monitoring circuit 10 for monitoring address passing between write address and read address.

The operation of this circuit will next be explained with reference to FIG. 3.

Based on input H and input V which are respectively the horizontal and vertical synchronizing signals of an input video signal, the input video clock generator 8 generates and outputs a write clock signal WCLK, a write reset signal WRST, a write select signal WE and write enable signals WE1 and WE2.

Write clock signal WCLK is synchronized to input H and corresponds to the bit rate of an input video signal consisting of digital data. Write select signal WE is synchronized to input V and its signal level is inverted at each cycle of input V. This write select signal WE is directly inputted to AND gate 81 and is also inverted by an invertor 82 and inputted to AND gate 83.

The input video clock generator 8 contains a first clock generator 84 which outputs a signal DISP1 indicating the valid display period of an input video signal. This signal DISP1 starts after a predetermined period of time t has elapsed following the inversion of write select signal WE and is inputted to AND gates 81 and 83. Therefore, write enable signals WE1, WE2 outputting alternately at the H level in compliance with the signal level of write select signal WE are outputted from AND gates 81 and 83 during the same period as signal DISP1. In addition, a write reset signal WRST is also output in synchrony with the start of DISP1. As a result, signals WE1, WE2 and WRST are all outputted after a predetermined period of time t has elapsed following the inversion of write select signal WE. For instance, if the horizontal synchronizing signal cycle of an input video signal is 1 H (one horizontal scan period), approximately 20 H may be chosen for time t.

Write address counters 3, 4 within field memories 1, 2 are set by a write reset signal WRST and these counters increment write addresses by counting the write clock signal WCLK when signals WE1, WE2 are at the H level. Therefore, an input video signal is written sequentially into field memories 1 and 2 from a lower address to an upper address or written alternately in field units according to write enable signals WE1, WE2.

A display video clock generator 9 creates and outputs display H and display V which are respectively a horizontal synchronizing signal and a vertical synchronizing signal of the display video signal. Moreover, the display video clock generator 9 outputs a read clock signal RCLK, a read reset signal RRST, a read select signal RE and read enable signals RE1 and RE2.

The read clock signal RCLK is generated in compliance with the bit rate of the display video signal so as to synchronize with display H and the read select signal RE is outputted in synchrony with display H so that the signal level inverts at each cycle of display V. This read select signal RE is inputted to AND gate 91 via an exclusive OR gate (EX-OR) 95 to which is also inputted an output signal MON from an address monitoring circuit 10, inverted by an invertor 92 and inputted to AND gate 93.

The display video clock generator 9 contains a second clock generator 94 which outputs a signal DISP2 indicating the valid display period of a display video signal. This signal DISP2 starts after a designated period of time t has elapsed following the inversion of read select signal RE and this signal DISP1 is inputted to AND gates 91 and 93. Therefore, when signal MON is at the L level, read enable signals RE1, RE2 are outputted from AND gates 91 and 93 during the same period as signal DISP2 in accordance with the signal level of read select signal RE. In addition, a read reset signal RRST is also output in synchrony with the start of DISP2. As a result, signals RE1, RE2, RRST are all outputted after a predetermined period of time t has elapsed following the inversion of read select signal RE.

Read address counters 5, 6 within field memories 1, 2 are set by a read reset signal RRST and increment read addresses by counting the read clock signal RCLK when signals RE1, RE2 are at the H level. Therefore, reading is carried out sequentially from field memories 1 and 2 from a lower address to an upper address or alternately in field units according to read enable signals RE1, RE2.

However, when the address monitoring circuit 10 has predicted that address passing will be generated in either of the two field memories 1 and 2, signal MON rises to the H level. If the signal MON is already H level, the level will be changed to L level. Since the EX-OR gate 95 inverts signal RE when the signal MON rises to the H level, the signal levels of signals RE1 and RE2 are reversed and as a result the field memory of the two field memories 1, 2 which has carried out reading then carries out reading a second time continuously. In other words, address passing in a single field memory is avoided and deterioration in image quality is prevented by changing the read memory.

The address monitoring circuit 10 will next be explained is detail with reference to FIG. 1.

Figure 1:
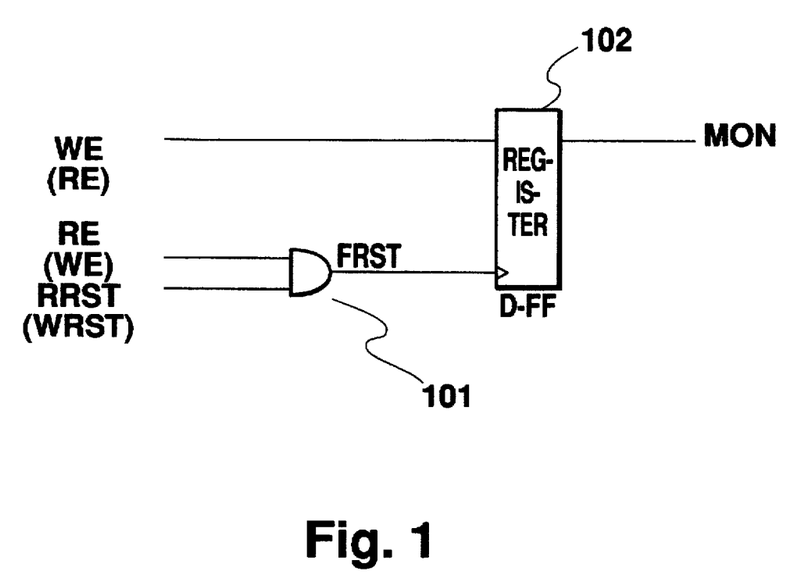
FIG. 1 is a circuit diagram depicting an address monitoring circuit.

As FIG. 1 shows, the address monitoring circuit 10 has an extremely simple configuration comprising an AND gate 101 to which are inputted a read select signal RE and a read reset signal RRST and a 1-bit data register formed of a D-type flip-flop 102 to a clock terminal of which is inputted the output signal FRST from the AND gate 101 and to a data terminal of which is inputted a write enable signal WE. AND gate 101 is a gate for extracting a read reset signal RRST of the field in which signal RE changes without fail to the H level. The match between signals WE and RE is detected by capturing signal WE in the register 102 with the output FRST of AND gate 101, and when they match as signal MON, H level is outputted; when there is no match, L level is outputted.

Figure 3:
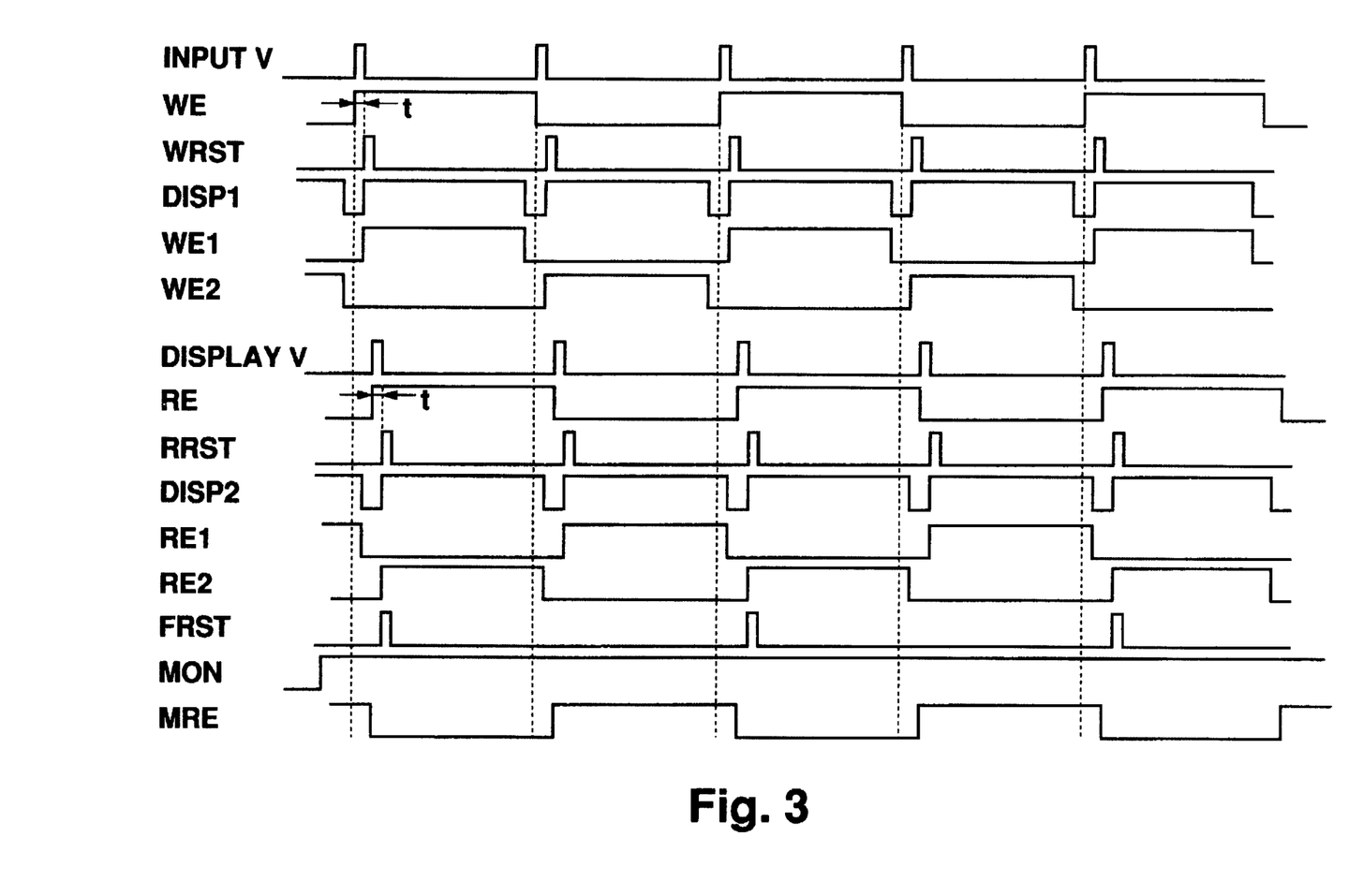
FIG. 3 is a timing chart in a case where phase difference between input V and display V is small.

As shown in FIG. 3, when the frequencies of input V and display V are close and the phase difference between signals WE and RE is comparatively low, the frequency difference and phase difference of signals WE and RE are also low. Since selection of field memories 1 and 2 is carried out based on signals WE and RE, a low phase difference means that writing and reading will be carried out almost entirely from the same field memory and consequently there is a possibility that either the write address or the read address will pass the other within the single field memory. In this case, since the H level signal WE is captured in the register 102 of the address monitoring circuit 10 with the start of the AND gate output FRST, the signal MON is changed to the H level and a prediction of address passing is thus made. If the signal MON is already H level, the level will be changed to L level. Consequently, the signal RE and the output signal MRE from the EX-OR gate are inverted and address passing is thereby averted.

When the phase difference between signals WE and RE is large even though the frequencies of input V and display V are close together, writing and reading are carried out with different field memories. Therefore, the write and read addresses do not pass each other within the same frame. In this case, since the L level signal WE is captured in the register 102 of the address monitoring circuit 10 with the start of the AND gate output FRST, the signal MON keeps the L level and a prediction of no generation of address passing is thus made. Consequently, no change is made to the read memory by the signal RE.

Figure 5:
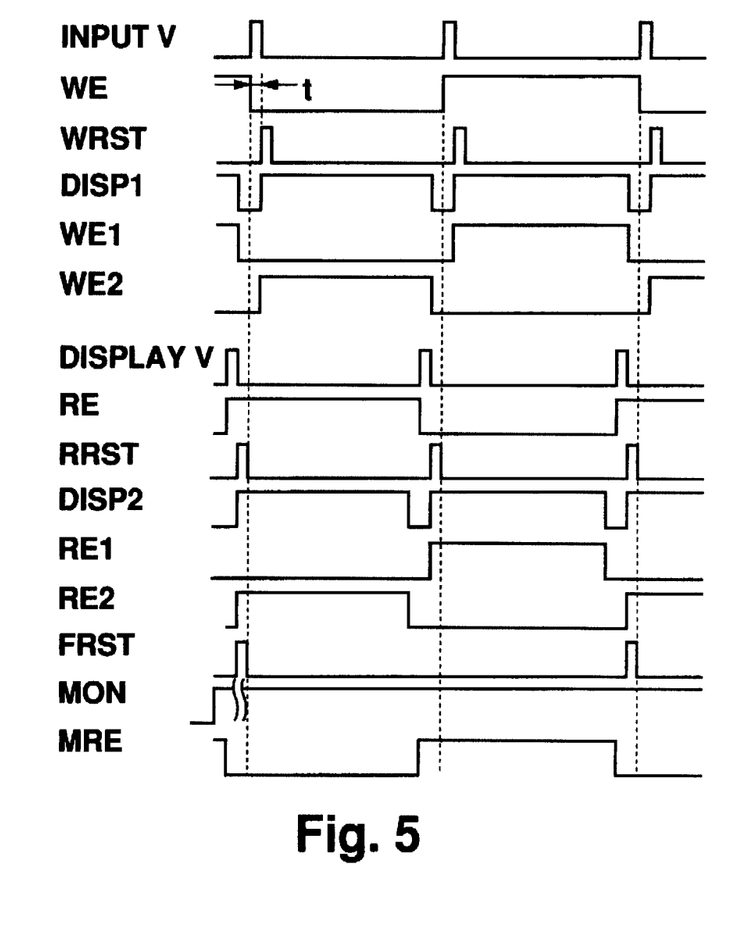
FIG. 5 is another timing chart in a case where phase difference between input V and display V is small.

However, let us suppose that the phase difference has gradually increased from the state depicted in FIG. 3 to that shown in FIG. 5. In the address monitoring circuit 10, when the gate output FRST has started, the D-type flip-flop 102 captures an H level immediately before it falls to the L level as signal WE. As a result, signal MON rises to the H level, signal RE is inverted in compliance therewith, signal MRE changes to the same level (L level) as signal WE and writing and reading are both carried out for field memory 2.

However, reading out from field memory 2 actually commences when signals RRST and RE2 have risen to the H level, namely before signal WE is inverted to the L level. Since writing in field memory 2 commences when signals WE2 and WRST have started, in other words when a predetermined time t has elapsed following the inversion of signal WE, a time difference of at least t occurs between execution of reading and writing.

Since the case considered here is one in which the frequencies of input V and display V are close, the cycle difference between both signals within one frame does not decrease to a time less than t and therefore as long as there is a time difference of at least t, no address passing will be generated during writing in or reading out from the same field memory. Thus in this case there is no problem even if the signal MON rises to the H level.

Figure 4:
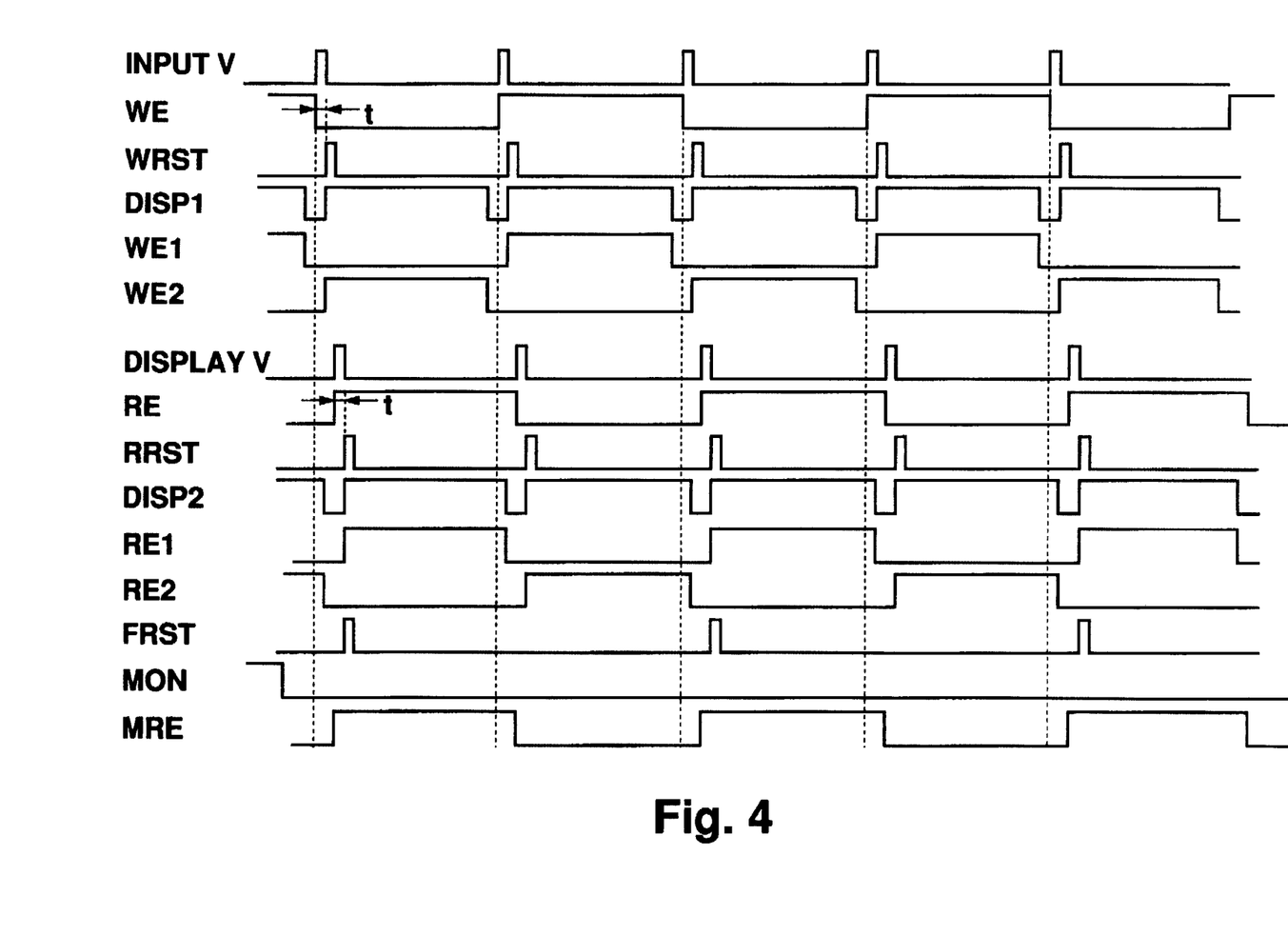
FIG. 4 is a timing chart in a case where phase difference between input V and display V is large.
Figure 6:
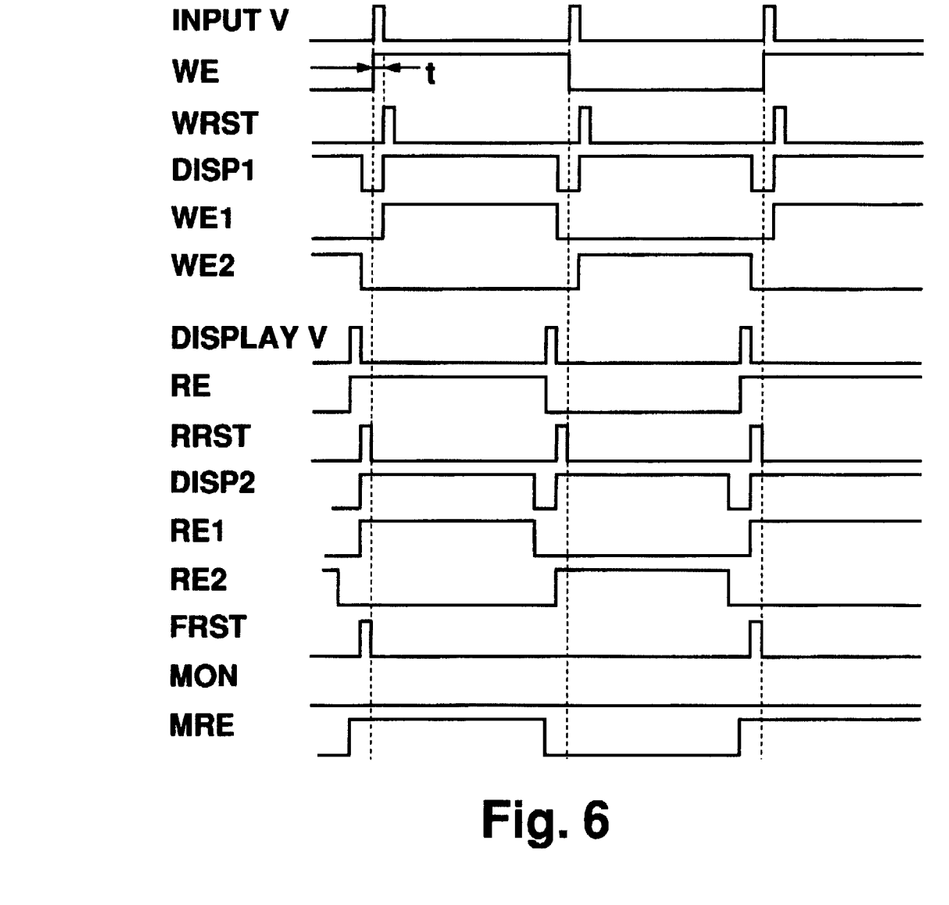
FIG. 6 is another timing chart in a case where phase difference between input V and display V is large.

Next, let us suppose that the phase difference has gradually decreased from the state depicted in FIG. 4 to that shown in FIG. 6. In this state, when the gate output FRST has started, D-type flip-flop 102 in the address monitoring circuit 10 captures an L level immediately before it rises to the H level as signal WE. As a result, signal MON changes to the L level, signal RE is not inverted, signal MRE changes to the same level (H level) as signal WE and writing and reading are both carried out for field memory 1.

However, reading out from field memory 1 actually commences when signals RRST and RE1 have risen to the H level, namely before signal WE is inverted to the H level. Since writing in field memory 1 commences when signals WE1 and WRST have started, in other words when a designated time t has elapsed following the inversion of signal WE, a time difference of at least t occurs between execution of reading and writing. Then, if the frequencies of input V and display V are close, the cycle difference between both signals within one frame does not decrease to a time less than t and therefore no address passing will be generated during writing in or reading out from the same field memory. Thus in this case there is no problem even if the signal MON falls to the L level.

The operation when passing is predicted between a write address and a read address will next be explained.

First, in FIG. 5, signal WE is at the H level at the start of signal RRST when signal RE is at the H level. Signal MON is at the H level and signal MRE is equivalent to the inverse of signal RE. When signal RE is at the H level, signal RE2 changes to the H level and when signal RE is at the L level, signal RE1 changes to the H level and an alternate display video signal is thus read out from buffer memories 1 and 2.

Now let us assume that the phases of signal RE and signal WE have gradually become misaligned as in FIG. 4. In this case, signal WE falls to the L level at the start of signal RRST when signal RE is at the H level and signal MON changes to the L level. Therefore, signal MRE becomes identical to signal RE and signals RE1 and RE2 are both inverted. Therefore when this change occurs, reading is carried out continuously from a single buffer memory 1 or 2, i.e. to the opposite buffer memory to the write memory. In other words, according to this embodiment, when the read memory will be changed to the same memory as the write memory, the next read memory is changed and address passing during reading is prevented by carrying out reading continuously from a single buffer memory. Thus address passing is determined by an inversion of signal MON and continuous reading is carried out from a single buffer memory. As a result, the read memory is changed to buffer memory 1 or 2 which have different write memory.

In the example depicted in FIG. 6, signal WE is at the L level at the start of signal RRST when signal RE is at the H level. When this has shifted to a state such as that shown in FIG. 3, signal WE rises to the H level at the start of signal RRST when signal RE is at the H level. In this case, signal MON changes from the H level to the L level and signal MRE consequently changes from being identical to signal RE to being opposite to signal RE. Therefore, when the read memory is the same as the write memory, the read memory is changed to buffer memory 1 or 2, i.e. to the opposite buffer memory to the write memory.

In other words, in this embodiment, when the read memory has changed to the same as the write memory, an identical buffer memory 1 or 2 is continuously read out and the read memory then differs from the write memory.

Thus when the write memory and read memory have matched, the read memory is changed to the other buffer memory 1 or 2 and the read memory consequently differs from the write memory.

Furthermore, when both read and write memories have matched without the read memory having been changed, similar prevention of address passing can be achieved by changing the write memory.

Although address passing was predicted at each frame in the above description, predictions can alternatively be made at each field. For example, an address monitoring circuit 10 can be configured with an EX-NOR gate 103 to which are inputted signals RE and WE, and a D-type flip-flop 104 having the output from this NOR gate inputted to a data terminal D and signal RRST inputted to a clock terminal CL, as FIG. 7 shows.

Figure 7:
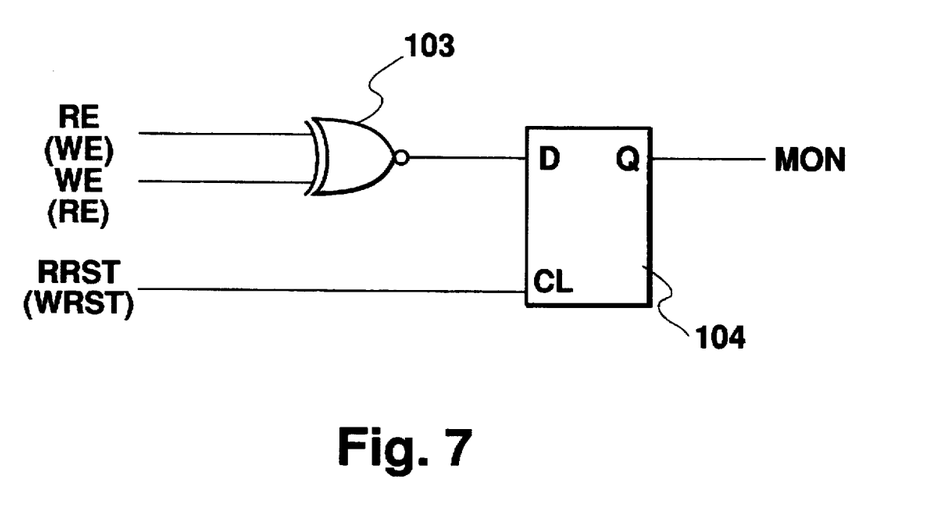
FIG. 7 is a circuit diagram depicting another example of an address monitoring circuit.
Figure 8:
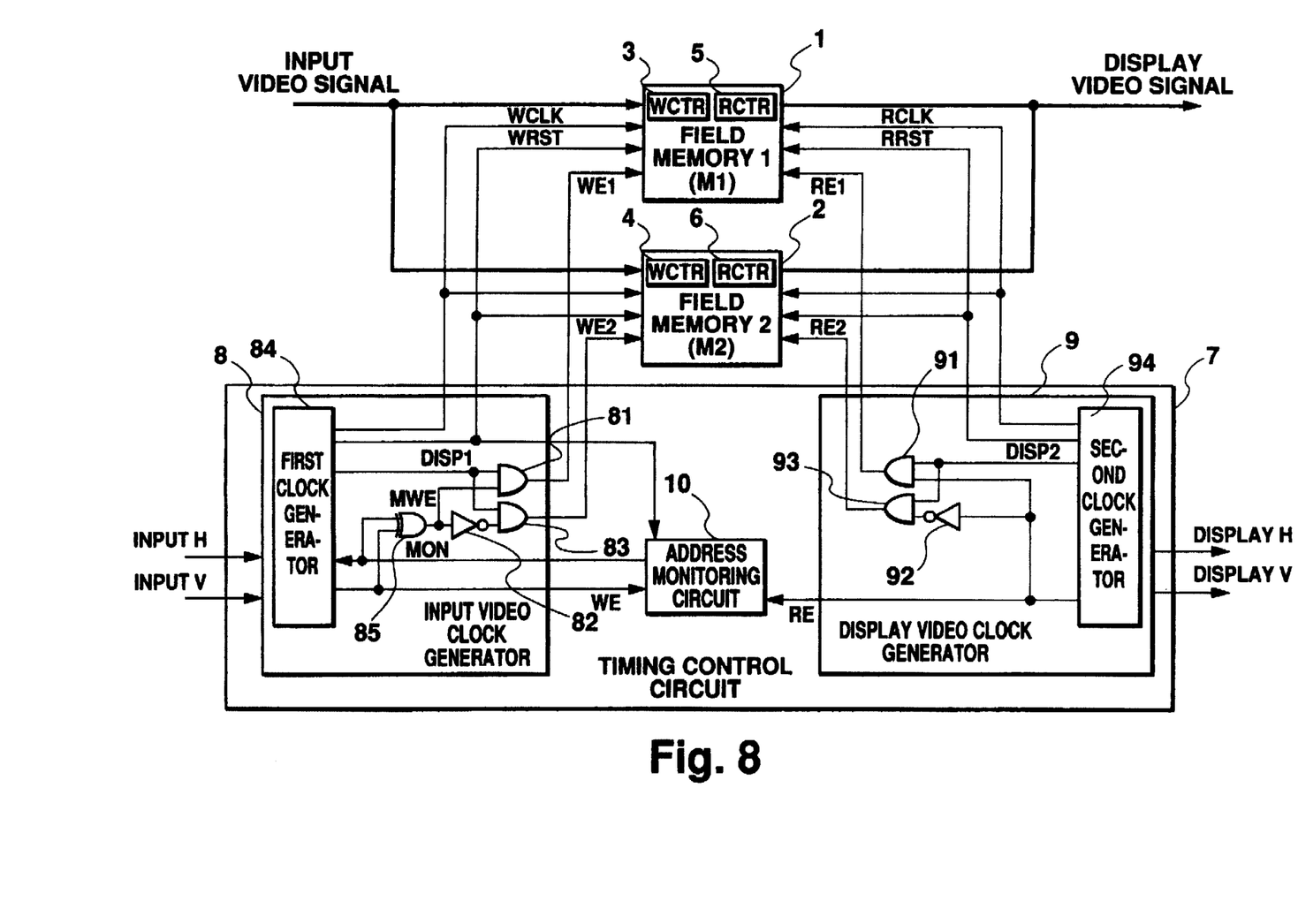
FIG. 8 is block diagram depicting a video signal processing circuit for changing a write memory.

Furthermore, in the embodiment described above, address passing was predicted at the commencement of the reading operation based on signal RRST, but with the same configuration address passing can be predicted at the commencement of the writing operation by using signals WRST, WE and RE instead of signals RRST, RE, WE respectively in FIGS. 1 and 7. In this case, as FIG. 8 shows, the EX-OR gate 95 shown in FIG. 2 which inputs the signal MON is removed and signal RE is used instead of signal MRE, the EX-OR gate 85 is installed on the writing side, signals MON and WE are inputted thereto and the output and inverted output from the EX-or gate 85 are inputted to AND gates 81 and 83. In this way, when address passing has been predicted, instead of carrying out reading continuously from a single field memory, writing can be continuously carried out and according to this configuration, address passing can be avoided.

The present invention is of course suitable not only for a system using a field memory but also for a system using a frame memory.

Thus according to the present invention when the frequencies of an input video signal and a display video signal are close, writing and reading address passing in a buffer memory can be predicted using an extremely simple configuration and is particularly suitable for a case in which a buffer memory is used for internally determining write and read addresses in compliance with an input clock.

While there have been described what is at present considered to be the preferred embodiments of the invention, it will be understood that various modifications may be made to the present invention and it is intended that the appended claims cover all such modifications as fall within the true spirit and scope of the invention.

What is claimed is:

1. A video signal processing circuit for obtaining a display video signal based on a second synchronizing clock from an input video signal based on a first synchronizing clock, said processing circuit comprising:

first and second buffer memories in which is written an input video signal in compliance with a write clock synchronized to a first synchronizing clock and from which is read out a display video signal in compliance with a read clock synchronized to a second synchronizing clock;

an input video clock generator for outputting the write clock and a write select signal with an alternately inverting signal level synchronized to a vertical synchronizing signal of an input video signal; and a display video clock generator for outputting the read clock and a read select signal with an alternately inverting signal level synchronized to a vertical synchronizing signal of an input video signal; and wherein in accordance with a signal level of the write select signal, either of first and second buffer memories is selected and an input video signal is written in the selected buffer memory starting at a predetermined time after inversion of the write select signal; and in accordance with a signal level of the read select signal, a display video signal is read out from either of first and second buffer memories;

said processing circuit further including a detecting circuit for detecting whether or not the signal levels of the write select signal and the read select signal match when the reading operation from the first and second buffer memories commences; wherein address passing between read and write addresses of the first and second buffer memories is then predicted according to a detection result of the detecting circuit.

2. A video signal processing circuit according to claim 1, wherein when generation of address passing in reading and writing has been predicted according to a detection result of the detecting circuit, a buffer memory which is about to carry out reading is changed to the buffer memory from which the reading has been completed.

3. A video signal processing circuit according to claim 1, wherein the detecting circuit has a register for storing a detection result; and by controlling whether or not to invert the read select signal in accordance with the content of the register, the generation of address passing is predicted when a detection result of the detecting circuit changes and reading is again carried out from the buffer memory from which the reading has been completed.

4. A video signal processing circuit for obtaining a display video signal based on a second synchronizing clock from an input video signal based on a first synchronizing clock, said processing circuit comprising:

first and second buffer memories in which is written an input video signal in compliance with a write clock synchronized to a first synchronizing clock and from which is read out a display video signal in compliance with a read clock synchronized to a second synchronizing clock;

an input video clock generator for outputting the write clock and a write select signal with an alternately inverting signal level synchronized to a vertical synchronizing signal of an input video signal; and a display video clock generator for outputting the read clock and a read select signal with an alternately inverting signal level synchronized to a vertical synchronizing signal of an input video signal; and wherein in accordance with a signal level of the write select signal, either of first and second buffer memories is selected and an input video signal is written in the selected buffer memory; and in accordance with a signal level of the read select signal, a display video signal is read out from either of first and second buffer memories starting at a predetermined time after inversion of the read select signal;

said processing circuit further including a detecting circuit for detecting whether or not the signal levels of the write select signal and the read select signal match when the writing operation in the first and second buffer memories commences; wherein address passing between read and write addresses of the first and second buffer memories is then predicted according to a detection result of the detecting circuit.

5. A video signal processing circuit according to claim 4, wherein when address passing between read and write addresses of the first and second buffer memories has been predicted according to a detection result of the detecting circuit, a buffer memory about to carry out writing is changed and writing is again carried out in the buffer memory in which the writing has been completed.

6. A video signal processing circuit according to claim 4, wherein the detecting circuit has a register for storing a detection result; and by controlling whether or not to invert the write select signal in accordance with the content of the register, the generation of address passing is predicted when a detection result of the detecting circuit changes and writing is again carried out in the buffer memory in which the writing has been completed.

7. A video signal processing circuit according to claim 1, wherein the detecting circuit comprises a gate circuit to which are inputted a read select signal state and a read reset signal indicating commencement of reading from a buffer memory for detecting the commencement of reading from either one of the buffer memories; and a register for receiving a detection result from the gate circuit and capturing a write select signal state at the commencement of reading from either one of the buffer memories.

8. A video signal processing circuit according to claim 1, wherein the detecting circuit comprises a gate circuit for detecting whether or not the states of a read select signal and a write select signal match; and a register for capturing the output of the gate circuit in accordance with the output of a read reset signal indicating commencement of reading from a buffer memory.

9. A video signal processing circuit according to claim 4, wherein the detecting circuit comprises a gate circuit to which are inputted a write select signal state and a write reset signal indicating commencement of writing in a buffer memory for detecting the commencement of writing in either one of the buffer memories; and a register for receiving a detection result from the gate circuit and capturing a read select signal state at the commencement of writing in either one of the buffer memories.

10. A video signal processing circuit according to claim 4, wherein the detecting circuit comprises a gate circuit for detecting whether or not the states of a read select signal and a write select signal match; and a register for capturing the output of the gate circuit in accordance with the output of a write reset signal indicating commencement of writing in a buffer memory.

* * * * *